(12) United States Patent
Obulisami et al.

(10) Patent No.: US 10,951,517 B2
(45) Date of Patent: Mar. 16, 2021

(54) DCB-BASED PATH SELECTION SYSTEMS AND METHODS FOR SAN TRAFFIC IN LAG TOPOLOGIES

(71) Applicant: DELL PRODUCTS L.P., Round Rock, TX (US)

(72) Inventors: Saravanan Obulisami, Chennai (IN); Ramesh Kumar Subbiah, Chennai (IN); Vibin Varghese, Chennai (IN)

(73) Assignee: DELL PRODUCTS L.P., Round Rock, TX (US)

( * ) Notice: Subject to any disclaimer, the term of this patent is extended or adjusted under 35 U.S.C. 154(b) by 154 days.

(21) Appl. No.: 16/386,135

(22) Filed: Apr. 16, 2019

(65) Prior Publication Data

US 2020/0336413 A1 Oct. 22, 2020

(51) Int. Cl.
| | |
|---|---|
| H04L 12/725 | (2013.01) |
| H04L 12/721 | (2013.01) |
| H04L 12/741 | (2013.01) |
| H04L 12/801 | (2013.01) |
| H04L 12/703 | (2013.01) |
| H04L 12/709 | (2013.01) |

(52) U.S. Cl.
CPC ............ *H04L 45/302* (2013.01); *H04L 45/14* (2013.01); *H04L 45/245* (2013.01); *H04L 45/28* (2013.01); *H04L 45/745* (2013.01); *H04L 47/15* (2013.01)

(58) Field of Classification Search
CPC ..... H04L 45/14; H04L 45/302; H04L 45/245; H04L 45/28; H04L 45/745; H04L 47/15
USPC .......................................................... 370/392
See application file for complete search history.

(56) References Cited

U.S. PATENT DOCUMENTS

| | | | | |
|---|---|---|---|---|
| 2011/0267941 | A1* | 11/2011 | Bitar | ........................ H04L 45/00 370/225 |
| 2014/0369186 | A1* | 12/2014 | Ernstrom | ............... H04L 45/586 370/228 |

* cited by examiner

*Primary Examiner* — Natasha W Cosme
(74) *Attorney, Agent, or Firm* — North Weber & Baugh LLP

(57) ABSTRACT

Data Center Bridge (DCB)-based path selection methods and systems reduce packet loss in a network system comprising a Link Aggregation Group (LAG) topology. In embodiments, once traffic received at a LAG node and identified as DCB traffic, links whose DCB status are identified as "up" are assigned to a LAG sub-trunk that may be used to forward the DCB traffic on the LAG trunk, while non-DCB traffic is forwarded to any member of the LAG, irrespective of DCB status. In addition, DCB traffic received from a LAG peer node, which sends traffic on an inter-node link (INL) when no DCB-enabled links to a downstream device are present, is identified as DCB traffic and forwarded on a LAG sub-trunk that comprises DCB-enabled links. An egress mask that indicates to not forward the traffic received at the LAG node on the INL may be overridden, such that DCB traffic may be forwarded.

20 Claims, 8 Drawing Sheets

*800*

DCB-BASED PATH SELECTION SYSTEMS AND METHODS FOR SAN TRAFFIC IN LAG TOPOLOGIES

BACKGROUND

The present disclosure relates generally to information handling systems. More particularly, the present disclosure relates to systems and methods for handling Storage Area Network (SAN) traffic in Link Aggregation Group (LAG) topologies that handle Data Center Bridge (DCB)-enabled traffic.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Common networking systems that utilize LAG topologies that handle DCB-enabled SAN traffic, such as internet Small Computer System Interface (iSCSI) and RDMA over Converged Ethernet (RoCE) traffic, require that DCB is operationally up on all LAG port channel members. In such topologies, an Inter-Chassis Link (ICL) (or Inter-Node Link (INL)) that connects LAG peer nodes, is typically used for data traffic only when the LAG port channel is operationally down. In situations when the DCB status of some or all LAG port channel members is down, SAN traffic is still being forwarded following the rules of a regular LAG hashing mechanism. A major drawback of such existing networks is that in cases when, for example, a path is congested, SAN traffic is dropped, even if, theoretically, a DCB-enabled path via other DCB enabled members ICL may exist. As a result, existing designs cannot take advantage of the ICL to forward DCB traffic, until all local LAG port channels are operationally down.

Accordingly, what is need are systems and methods that alleviate and, ideally, eliminate the shortcomings of existing designs.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may be not to scale.

DETAILED DESCRIPTION OF THE PREFERRED EMBODIMENTS

Figure 1:
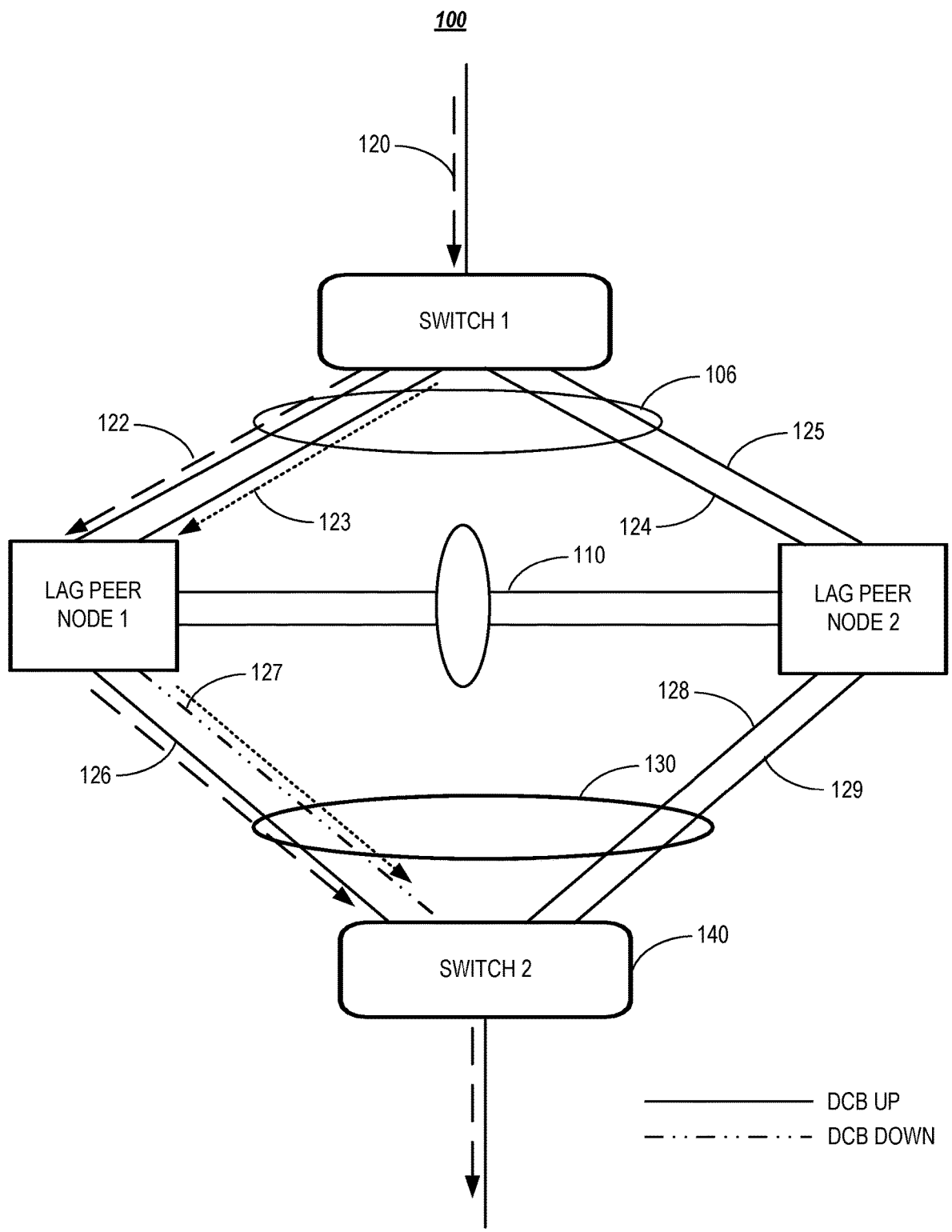
FIG. 1 ("FIG. 1") illustrates the effect of a link whose DCB status is down on DCB-enabled iSCSI traffic in a LAG topology that has a congested path.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall also be understood that throughout this discussion components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," and "comprising" shall be understood to be open terms and any lists the follow are examples and not meant to be limited to the listed items.

A service, function, or resource is not limited to a single service, function, or resource; usage of these terms may refer to a grouping of related services, functions, or resources, which may be distributed or aggregated. The use of memory, database, information base, data store, tables, hardware, and the like may be used herein to refer to system component or components into which information may be entered or otherwise recorded. The terms "data," "information," along with similar terms may be replaced by other terminologies referring to a group of bits, and may be used interchangeably. The terms "packet" or "frame" shall be understood to mean a group of bits. The term "frame" shall not be interpreted as limiting embodiments of the present invention to Layer 2 networks; and, the term "packet" shall not be interpreted as limiting embodiments of the present invention to Layer 3 networks. The terms "packet," "frame," "data," or "data traffic" may be replaced by other terminologies referring to a group of bits, such as "datagram" or "cell."

It shall be noted that: (1) certain steps may optionally be performed; (2) steps may not be limited to the specific order set forth herein; (3) certain steps may be performed in different orders; and (4) certain steps may be done concurrently. It shall also be noted that although embodiments described herein may be within the context of routers or switches, aspects of the present disclosure are not so limited. Accordingly, the aspects of the present disclosure may be applied or adapted for use in other contexts.

All documents cited herein are incorporated by reference in their entirety. The terms "VLT," "trunk," "LAG," and "VLAG" are used interchangeably. The terms "up" refers to "operationally up," "active," or "operational." Similarly, "down" refers to "operationally down," "inactive," or "not operational." DCB-enabled traffic refers to SAN traffic, such as RoCE traffic, iSCSI traffic, and similar storage traffic.

FIG. 1 illustrates the effect of a link whose DCB status is down on DCB-enabled iSCSI traffic in a LAG topology that has a congested path. In FIG. 1, switch 1 is communicatively coupled with LAG peer node 1 and LAG peer node 2 via a number of links that are bundled to a single logical port channel, LAG port channel 106, which comprises four links 122-125. Similarly, switch 2 is communicatively coupled with both LAG peer node 1 and LAG peer node 2 via four links 126-129 that are bundled to a single logical aggregation group or port channel, LAG port channel 130. This LAG bundling enables two or more different devices, e.g., physical devices, to become members of a common port channel and provides redundancy in certain failure scenarios, such that when a router, e.g., LAG peer node 1, goes down, another network node, e.g., LAG peer node 2 may take over the task of forwarding traffic to switch 2. In addition, LAG bundling increases bandwidth when compared to systems that do not take advantage of the LAG mechanism. INL 110 is an inter-chassis link that is used to forward data traffic only in scenarios when LAG port channel 130 is down.

It is noted that links 122-129 may each comprise any number of links. It shall also be noted that, in forming a LAG system, the LAG peer nodes 1 and 2 are connected via one or more links. These links may be referred to as Inter-Node links (INL), Inter-Chassis links (ICLs), or Virtual Link Trunk Interconnect (VLTi)—which terms may be used interchangeably herein. These links may be used to connect the peer nodes together to form the LAG system that, in at least some ways, acts with other network devices (e.g., switch 1 and switch 2) as a single larger chassis. The INL link(s) typically transfers the control protocols using a synch mechanism that synchronizes peer nodes. In embodiments, INL may be used for data traffic.

To provide (ideally) lossless communion for, e.g., iSCSI traffic that is storage traffic communicated between a server and a storage device that uses the iSCSI protocol, DCB is used to facilitate end-to-end communication on lossless paths. In order to provide DCB-enabled iSCSI traffic in LAG topology 100, it is mandatory that all LAG port channel members have the DCB status up to ensure end-to-end lossless communication between each hop and in each segment of network 100 that carries the DCB traffic. Assuming the DCB status of a link between two devices is down, if DCB traffic is forwarded on such links, it may be lost, thus, negating the goal of lossless communion.

For example, in FIG. 1, the DCB status of link 127 between LAG peer node 1 and switch 2 is down, which may have been caused by any number of reasons, such as a software bug or a configuration problem in a physical network interface card in a router or a host that may have resulted in the DCB status of link 127 being down. LAG topology 100 in FIG. 1 uses existing traffic forwarding methods, e.g., to forward packets from north to south, as indicated by the two sets of arrows 122, and 123, respectively that represent two different flows. A switch that acts as LAG peer node 1 forwards flow 123 on link 127 and forwards flow 122 on link 126. As indicated by broken lines, the DCB status of link 127 in FIG. 1 is down, nevertheless, link 127 continues to carry traffic since the status of the physical link itself is up.

In other words, because existing forwarding methods do not consider the DCB status on physical links, they will force DCB traffic to continue to flow, here, on links 126 and 127 irrespective of the fact that the DCB status of link 127 is down and a congestion may be present in a path in LAG network 100. As a result, iSCSI traffic between a server and a storage device may be dropped as switch 2 will not be able to control the flow on link 127.

In addition, LAG network 100, which uses existing forwarding methods, will ignore the fact that INL 110 may be DCB-enabled and, thus, available to forward DCB traffic. However, as indicated in the background section, the protocols of existing designs prevent usage of the INL, unless all local LAG port channels are physically down.

Accordingly, to prevent unnecessary traffic loss, it would be desirable to have systems and methods to forward DCB-enabled traffic even in the event that the DCB status of one or more LAG port-channel members is down.

Figure 2:
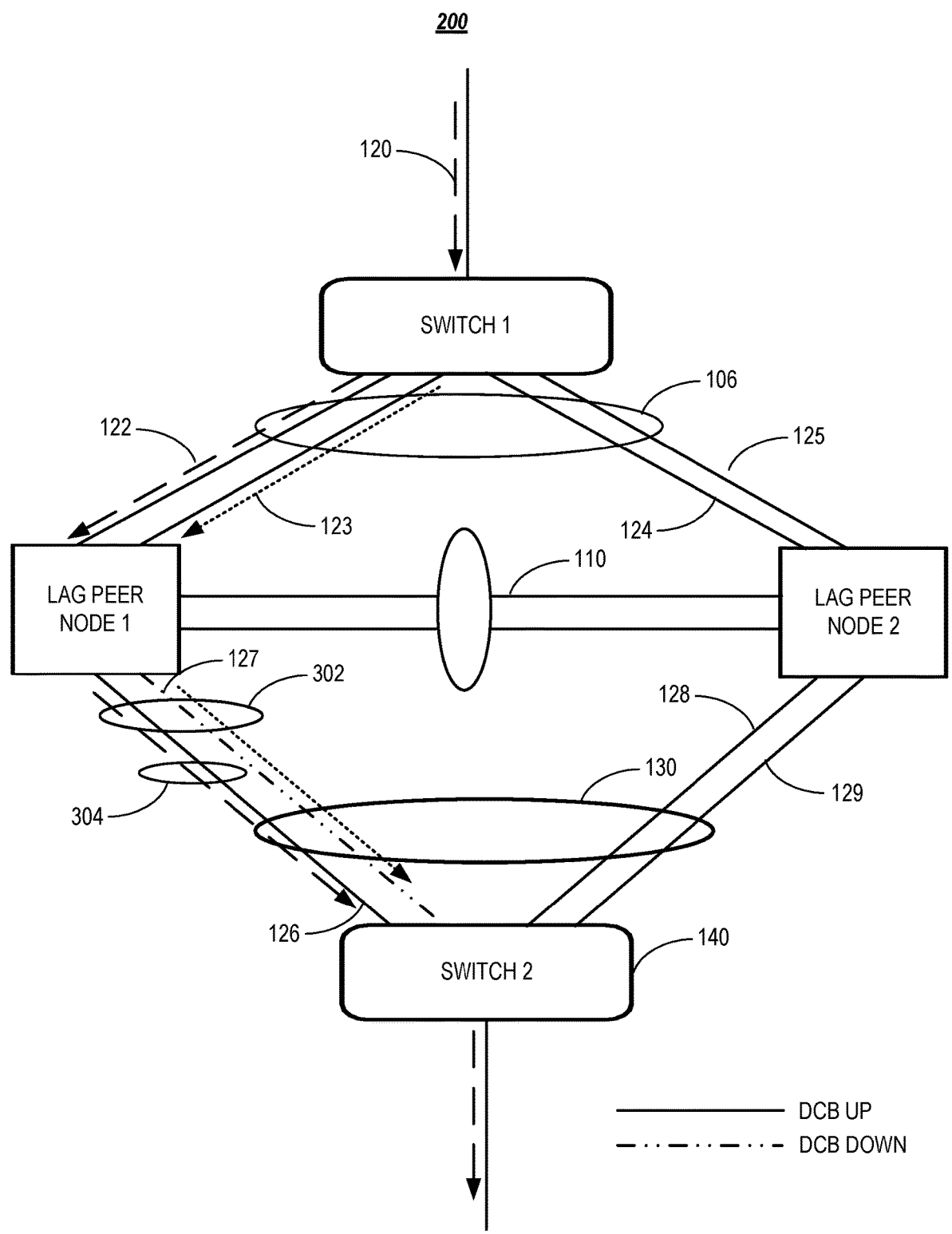
FIG. 2 illustrates DCB-based path selection according to embodiments of the present disclosure to help solve problems encountered in FIG. 1.

FIG. 2 illustrates DCB-based path selection according to embodiments of the present disclosure to help solve problems encountered in FIG. 1. For clarity, components similar to those shown in FIG. 1 are labeled in the same manner. For purposes of brevity, a description or their function is not repeated here. LAG peer node 111, 112 may be implemented as a networking switch, such as a router. It is understood that any number of links may be used, e.g., to increase bandwidth and redundancy of network 200.

As depicted in FIG. 2, LAG 302, also referred to herein as trunk 1, may be part of LAG port channel 130 and comprise links 126 and 127 onto which traffic, such as regular internet traffic, may get LAG-hashed according to known forwarding methods that do not need to take into account the DCB status of internet traffic. Instead, trunk 1 may forward any traffic as long as there is at least one link that is physically up. In other words, when forwarding traffic between nodes, LAG 302 does not distinguish between different types of traffic based on DCB status.

A user may set up an initial forwarding configuration of the LAG network, e.g., by configuring LAG port channel 302 as a single LAG port channel. In regular operation, once the initial forwarding configuration has been set up, in embodiments, LAG peer node 1 may internally create, e.g., by default and without user involvement, LAG 302 as a regular trunk, referred to herein as trunk 1 and LAG 304 as a sub-trunk, referred to herein as trunk 2, which may comprise any number of links, here link 126. Similarly, LAG peer node 2 may create its own trunks, as will be discussed in greater detail with respect to FIG. 4.

In embodiments, the regular trunk 302 in FIG. 2 may comprise all links of LAG port channel 302, and the sub-trunk may comprise the DCB-enabled links of LAG port channel 302. Therefore, the sub-trunk may comprise links whose DCB status is up and onto which DCB-enabled traffic may get LAG-hashed. In embodiments, trunk 2 is a sub-trunk that comprises a sub-group of links that are part of trunk 1.

In embodiments, member links of trunk 2 may be automatically determined, e.g., by LAG peer node 1, which may assign to links DCB-enabled classifications based on detecting the DCB status of each link, e.g., in response to detecting that the DCB status of one of its links is down. For example, since a switch uses Link Layer Discovery Protocol (LLDP) messages that are periodically exchanged on each link to acquire the DCB status of each link, in embodiments, links may be categorize according to their status, and the switch may configure (e.g., populate or program) its hardware forwarding table(s) to point to a desired trunk based on a link status determination.

In embodiments, the switch may identify DCB-enabled traffic by using certain values based on, e.g., dot1p (IEEE 802.1p) or differentiated services code point (DSCP), which specify how much certain traffic should be prioritized. Typically, dot1p/dscp values are created by networking devices, communicated via Ethernet/IP headers of frames, and preserved when incoming traffic is forwarded. As an example, a VLAN tag in an Ethernet frame may specify a user-configurable dot1p value that indicates whether traffic is DCB-enabled, such as iSCSI traffic.

As a result, in embodiments, when configuring its hardware forwarding table(s), the switch will be able to use the dot1p or dscp values to recognize DCB-enabled traffic and configure its hardware forwarding table(s) to point to trunk 2 for DCB-enabled traffic. Conversely, the switch will be able to distinguish that traffic from non-DCB-enabled traffic that follows conventional forwarding rules and, thus, the switch may configure its hardware forwarding table(s) to point to trunk 1 for non-DCB-enabled traffic.

In embodiments, if a certain DCB-enabled link that has been assigned the DCB status up goes down, LAG peer node 1 may adjust a hardware table that comprises trunk 2 data, such as to exclude the down link, for example, to reflect that that the "failed" link is no longer suitable for DCB traffic. As a result, iSCSI traffic would no longer be hashed to that link.

It is understood that, in embodiments, once a link changes its status from down to up, it may be automatically added into the appropriate hardware table and, thus, again become a member of trunk 2.

Each switch in network 200 may comprise user-configured Priority-Based Flow Control (PFC) values that may be communicated between switches. In embodiments, PFC, which identifies lossless traffic, may be enabled based on switch configuration, e.g., when PFC values for two switches match. In embodiments, communication between switches comprises an exchange of configuration information that comprises PFC values, which may be used as a deciding factor whether the DCB status of a link is up or down. For example, if a PFC value between two switches matches, then the DCB status on a link between those switches may be considered up. Conversely, if the PFC values do not match, the DCB status may be considered down.

It is understood that PFC values may be configured based on dot1p or dscp values, such that, in embodiments, if in a switch PFC values are dot1p configured, traffic comprising same dot1p/dscp values may be identified as DCB-enabled traffic.

Figure 3:
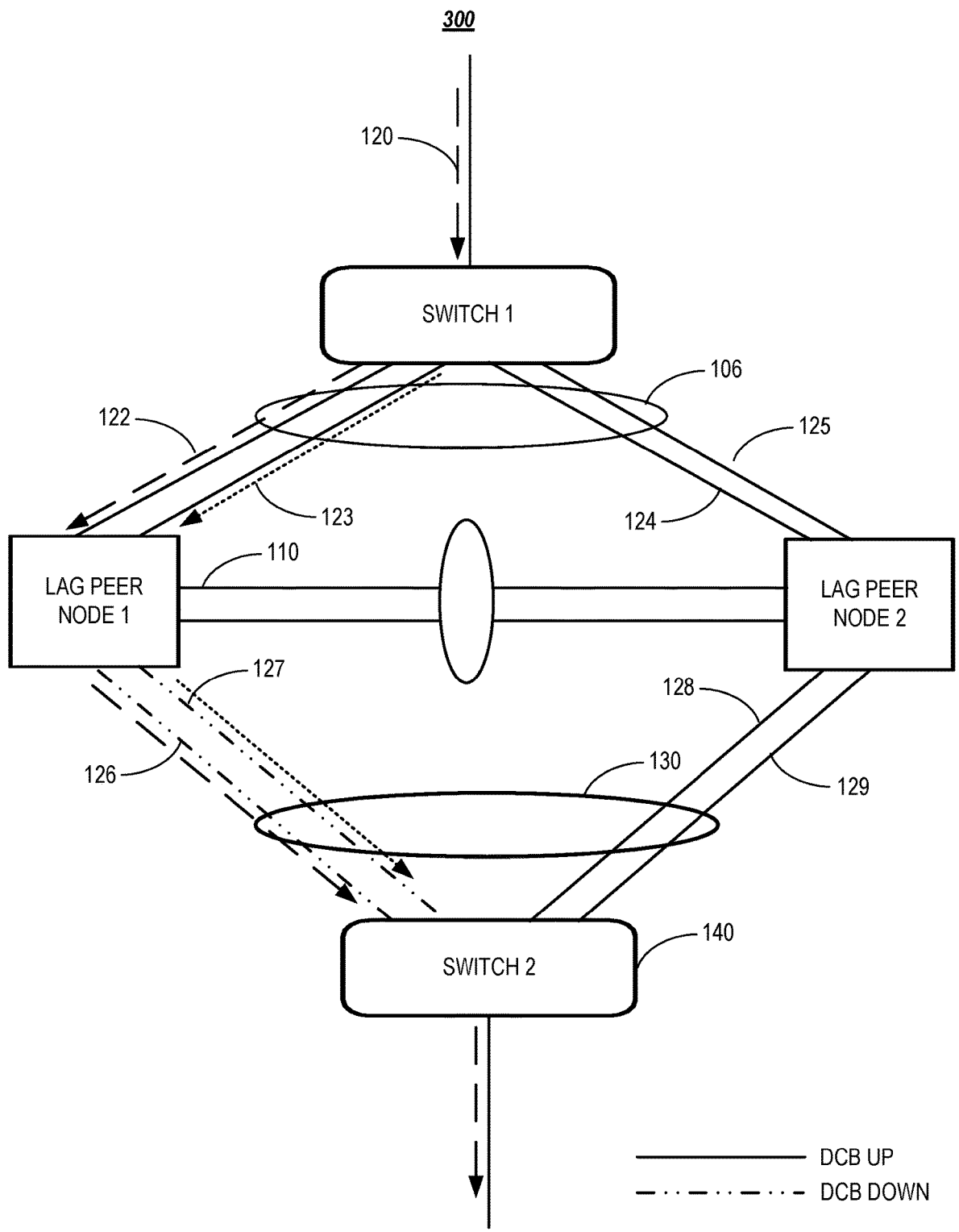
FIG. 3 illustrates the effect of all links between two networking devices in the LAG topology of FIG. 1 having a DCB status of down in the presence of a congestion.

FIG. 3 illustrates the effect of all links between two networking devices in the LAG topology of FIG. 1 having a DCB status of down in the presence of a congestion. Same numerals as in FIG. 1 denote same elements. As indicated by the broken line, link 126 now also has the status of DCB down, such that all links 126, 127 between LAG peer node 1 and switch 2 have the same DCB down status.

As with FIG. 1, LAG topology 300 in FIG. 3 uses existing traffic forwarding methods. These methods include common mechanisms that avoid loops that may result in unwanted duplicate traffic. To accomplish this in LAG topology 300, only one of LAG peer nodes 1 and 2 is allowed to forward the same traffic to switch 2.

For this purpose, LAG peer 2 typically uses a hardware forwarding table that comprises an egress mask to prevent forwarding of certain traffic that LAG peer 2 receives on INL 110. This actively blocks the same traffic from reaching switch 2 via both INL 110 and link 126 and/or 127, i.e., duplicate traffic. Only after the status of links 126 and 127 becomes physically down will the egress mask be removed from the hardware table of LAG peer 2, such that the flow between LAG peer 1 and switch 2 may continue via INL 110. Accordingly, is desirable to have systems and methods in place that better utilize links, including INLs, to forward DCB-enabled traffic and prevent traffic loss in the presence of a congestion in the LAG network.

Figure 4:
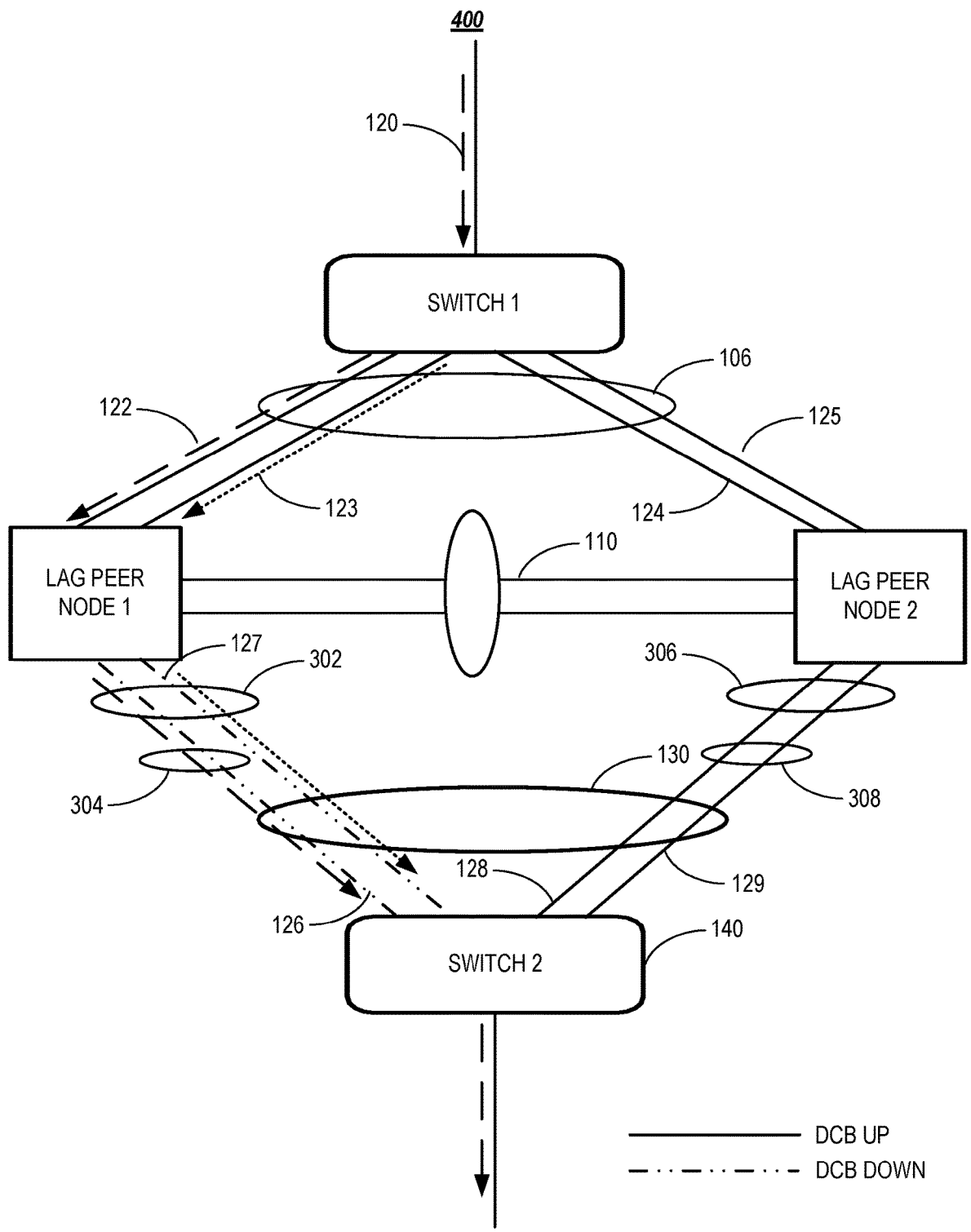
FIG. 4 illustrates DCB-based path selection according to embodiments of the present disclosure to help solve problems encountered in FIG. 3.

FIG. 4 illustrates DCB-based path selection according to embodiments of the present disclosure to help solve problems encountered in FIG. 3. Components similar to those shown in FIG. 2 are labeled in the same manner, and a description or their function is not repeated. In a manner similar to FIG. 2, in network system 400, LAG peer node 2 may create LAG 306 as a regular trunk and LAG 308 as a sub-trunk.

In embodiments, if both links 126 and 127 have the same DCB down status, such that LAG 304 has no DCB-enabled member links, INL 110 may be made part of LAG 304. For example, since the physical status of all links between LAG peer node 1 and switch 2, i.e., links 126 and 127 in LAG 302 is down, LAG peer node 1 may automatically program its tables to make INL 110 part of sub-trunk 2, such that DCB-enabled/PFC-enabled traffic may be forwarded to LAG peer 2 via INL 110, while regular traffic may continue to be forwarded to switch 2 on any of links 126 and 127 that are physically up.

In embodiments, if, subsequently, the DCB status of any of the links between LAG peer node 1 and switch 2 changes back to up, LAG peer node 1 may automatically remove INL 110 from sub-trunk 2 and resume with using the link 126 and/or 127 whose DCB status is up.

In embodiments, similar to LAG peer 1, LAG peer 2 may be connected to switch 2 via a trunk for regular traffic and sub-trunk for DCB-enabled traffic that may also be labeled trunk 1 and trunk 2 since the numbering may be local to each individual LAG peer node.

In embodiments, LAG peer node 2 utilizes a mechanism that overrides a present egress mask in a hardware forwarding table in LAG peer node 2, so as to permit traffic that has been identified as DCB traffic and that LAG peer 2 has received on INL 110, i.e., on DCB-enabled member(s) of INL 110, to be forwarded to switch 2. In embodiments, the hardware forwarding table LAG peer node 2 may point to sub-trunk 308 that comprises one or more DCB-enabled links between LAG peer 2 and switch 2, while non-DCB traffic may continue to flow on links 126 and 127 according to common forwarding rules.

It is understood that the egress mask in the hardware forwarding table in LAG peer node 2 may be overridden by a suitable hardware entry. It is further understood that just as network system 200, network system 400 in FIG. 4 is not limited to the components shown therein or described in the accompanying text. As those skilled in the art will appreciate, a suitable network system may comprise any number of physical and virtual devices in numerous topologies.

Figure 5:
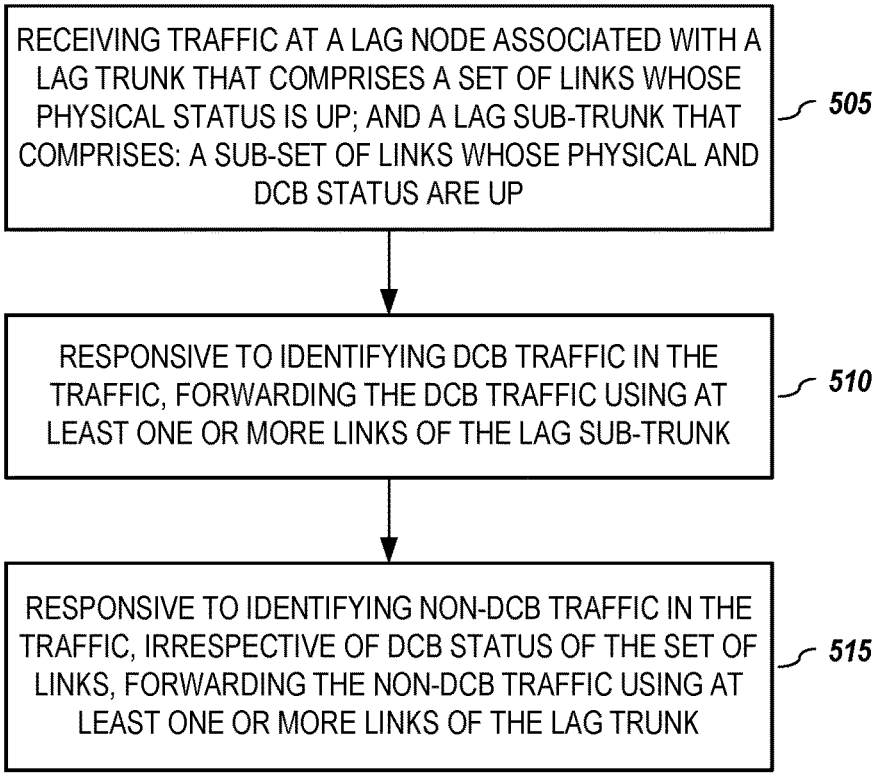
FIG. 5 is a flowchart of an illustrative process for DCB-based path selection for reducing packet loss in a network system comprising a LAG topology, according to embodiments of the present disclosure.

FIG. 5 is a flowchart of an illustrative process for DCB-based path selection for reducing packet loss in a network system comprising a LAG topology, according to embodiments of the present disclosure. Process 500 starts when traffic is received (505) at a LAG node. Responsive to identifying DCB traffic in the traffic, one or more links whose DCB status is up are identified (510) and assigned to a LAG sub-trunk. The one or more links may then be used (515) to forward the DCB traffic on the LAG sub-trunk. Responsive to identifying non-DCB traffic in the traffic, embodiments may indicate (520) that the non-DCB traffic be forwarded on links irrespective of their DCB status.

Figure 6:
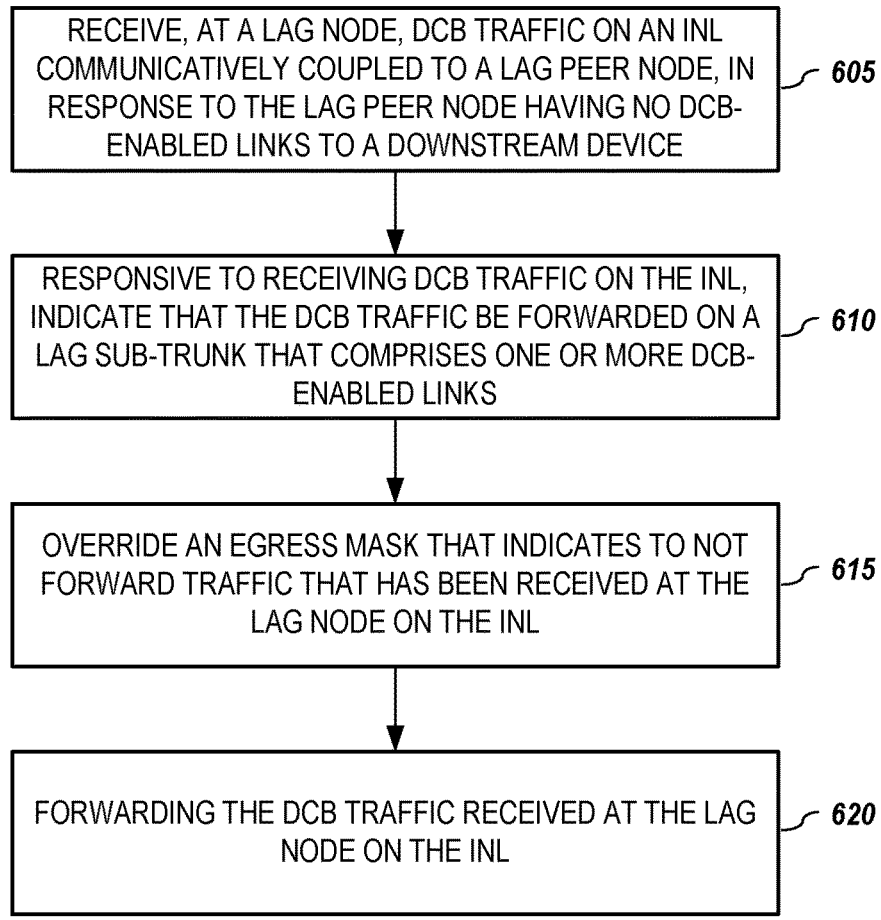
FIG. 6 is a flowchart of an illustrative process for DCB-based path selection for reducing packet loss in a network system comprising a LAG topology that utilizes an INL, according to embodiments of the present disclosure.

FIG. 6 is a flowchart of an illustrative process for DCB-based path selection for reducing packet loss in a network system comprising a LAG topology that utilizes an INL, according to embodiments of the present disclosure. Process 600 starts when DCB traffic is received (605), e.g., by a DCB-based path selection device, at a LAG node on an INL that is coupled to a peer LAG node, which, in response to having no DCB-enabled links to a downstream device, may send traffic on the INL. Responsive to receiving DCB traffic from the peer LAG node via the INL, the DCB-based path selection device may indicate (610) that the DCB traffic be forwarded on a LAG sub-trunk that comprises one or more DCB-enabled links. An egress mask that indicates to not forward the traffic received at the LAG node on the INL may be overridden (620), and the DCB traffic that has been received at the LAG node may be forwarded (625).

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, etc.) smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, ROM, and/or other types of memory. Additional components of the computing system may include one or more disk drives, one or more network ports for communicating with external devices as well as various input and output (I/O) devices, such as a keyboard, a mouse, touchscreen and/or a video display. The computing system may also include one or more buses operable to transmit communications between the various hardware components.

Figure 7:
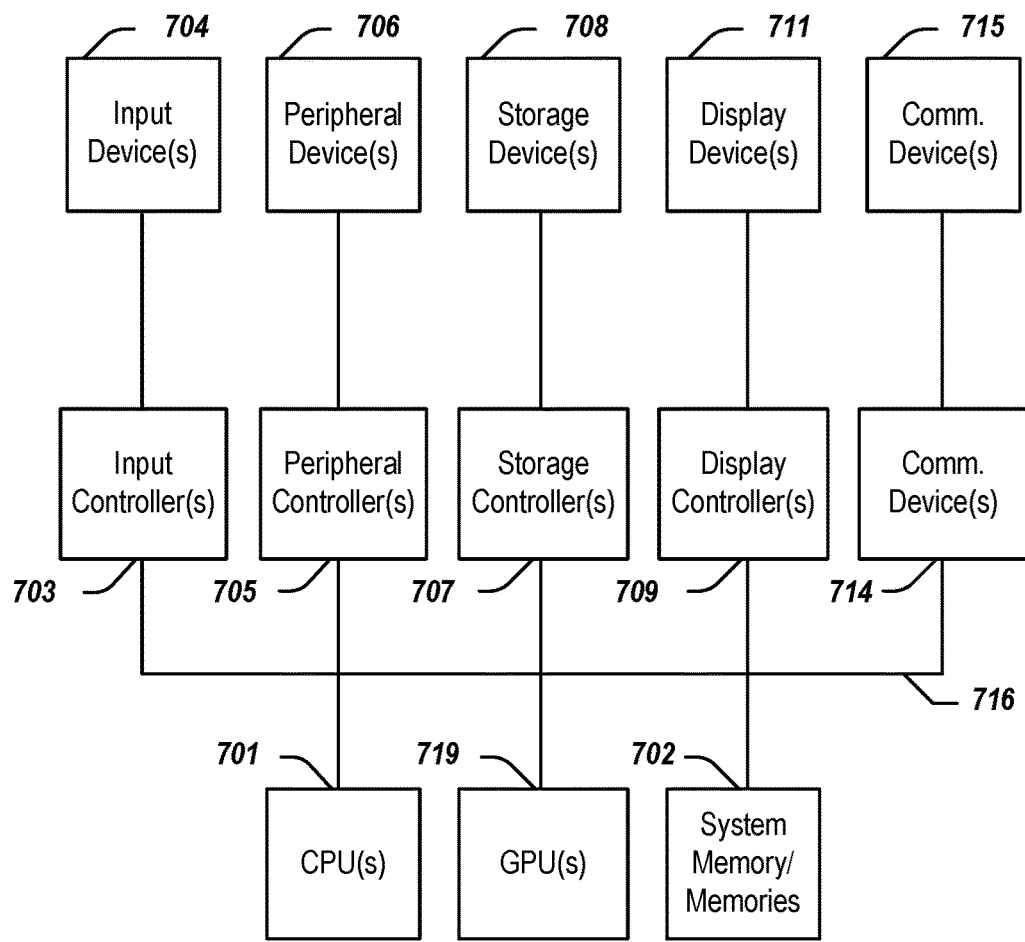
FIG. 7 depicts a simplified block diagram of an information handling system according to embodiments of the present invention.

FIG. 7 depicts a simplified block diagram of an information handling system (or computing system) according to embodiments of the present disclosure. It will be understood that the functionalities shown for system 700 may operate to support various embodiments of a computing system—although it shall be understood that a computing system may be differently configured and include different components, including having fewer or more components as depicted in FIG. 7.

As illustrated in FIG. 7, the computing system 700 includes one or more central processing units (CPU) 701 that provides computing resources and controls the computer. CPU 701 may be implemented with a microprocessor or the like, and may also include one or more graphics processing units (GPU) 719 and/or a floating-point coprocessor for mathematical computations. System 700 may also include a system memory 702, which may be in the form of random-access memory (RAM), read-only memory (ROM), or both.

A number of controllers and peripheral devices may also be provided, as shown in FIG. 7. An input controller 703 represents an interface to various input device(s) 704, such as a keyboard, mouse, touchscreen, and/or stylus. The computing system 700 may also include a storage controller 707 for interfacing with one or more storage devices 708 each of which includes a storage medium such as magnetic tape or disk, or an optical medium that might be used to record programs of instructions for operating systems, utilities, and applications, which may include embodiments of programs that implement various aspects of the present disclosure. Storage device(s) 708 may also be used to store processed data or data to be processed in accordance with the disclosure. The system 700 may also include a display controller 709 for providing an interface to a display device 711, which may be a cathode ray tube (CRT), a thin film transistor (TFT) display, organic light-emitting diode, electroluminescent panel, plasma panel, or other type of display. The computing system 700 may also include one or more peripheral controllers or interfaces 705 for one or more peripherals 706. Examples of peripherals may include one or more printers, scanners, input devices, output devices, sensors, and the like. A communications controller 714 may interface with one or more communication devices 715, which enables the system 700 to connect to remote devices through any of a variety of networks including the Internet, a cloud resource (e.g., an Ethernet cloud, a Fiber Channel over Ethernet (FCoE)/DCB cloud, etc.), a local area network (LAN), a wide area network (WAN), a SAN or through any suitable electromagnetic carrier signals including infrared signals.

In the illustrated system, all major system components may connect to a bus 716, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Figure 8:
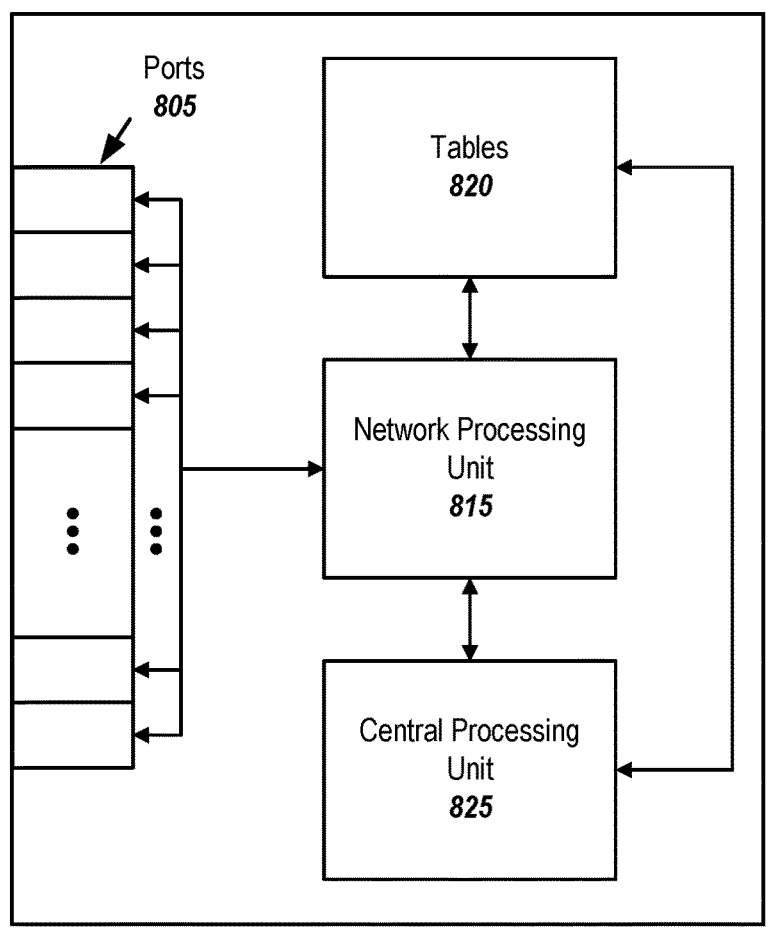
FIG. 8 depicts an alternative block diagram of an information handling system, according to embodiments of the present disclosure.

FIG. 8 depicts an alternative block diagram of an information handling system, according to embodiments of the present disclosure. It will be understood that the functionalities shown for system 800 may operate to support various embodiments of the present disclosure—although it shall be understood that such system may be differently configured and include different components (including fewer or more components).

The information handling system 800 may include a plurality of I/O ports 805, a network processing unit (NPU) 815, one or more tables 820, and a central processing unit (CPU) 825. The system includes a power supply (not shown) and may also include other components, which are not shown for sake of simplicity.

In one or more embodiments, the I/O ports 805 may be connected via one or more cables to one or more other network devices or clients. The network processing unit 815 may use information included in the network data received at the node 800, as well as information stored in the tables 820, to identify a next device for the network data, among other possible activities. In one or more embodiments, a switching fabric may then schedule the network data for propagation through the node to an egress port for transmission to the next destination.

Aspects of the present disclosure may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A Data Center Bridge (DCB)-based path selection method for reducing packet loss in a network system comprising a Link Aggregation Group (LAG) topology, the method comprising:
   receiving traffic at a LAG node associated with a LAG trunk that comprises:
      a set of links whose physical status is up; and
      a LAG sub-trunk that comprises a sub-set of links whose physical and DCB status are up;
   responsive to identifying DCB traffic in the traffic, forwarding the DCB traffic using at least one or more links of the LAG sub-trunk; and
   responsive to identifying non-DCB traffic in the traffic, irrespective of DCB status of the set of links, forwarding the non-DCB traffic using at least one or more links of the LAG trunk.

2. The method according to claim 1, further comprising, in response to the DCB status of all links of the LAG sub-trunk that communicative couple the LAG sub-trunk to a recipient of the traffic being down, programming an inter-node link (INL) to become part of the LAG sub-trunk to forward DCB-enabled traffic, via the INL, to a LAG peer node that comprises one or more DCB-enabled links.

3. The method according to claim 2, further comprising, in response to the DCB status of any of the links, which are coupled to the LAG node, changing from down to up, automatically removing the INL from the LAG sub-trunk.

4. The method according to claim 1, wherein the LAG node creates a forwarding table that identifies the sub-set of links whose DCB status are up as members of the LAG sub-trunk.

5. The method according to claim 4, wherein, the LAG node configures the forwarding table to point to the LAG sub-trunk according to DCB link status.

6. The method according to claim 5, wherein configuring the forwarding table comprises identifying the DCB traffic by using IEEE 802.1p or differentiated services code point (DSCP) values to recognize the DCB traffic.

7. The method according to claim 4, further comprising, in response to the DCB status of a link, which is coupled to the LAG node, changing to down, removing the link from the LAG sub-trunk.

8. The method according to claim 7, wherein in step of removing the link from the LAG sub-trunk comprises programming the forwarding table to exclude the link to indicate that the link is no longer suitable for DCB traffic.

9. The method according to claim 4, further comprising, in response to the link changing status from down to up, automatically adding the link to the LAG sub-trunk.

10. The method according to claim 9, wherein in step of automatically adding the link to the LAG sub-trunk comprises programming the forwarding table to include the link to indicate that the link is suitable for DCB traffic.

11. A Data Center Bridge (DCB)-based path selection device for reducing packet loss in a network system comprising a Link Aggregation Group (LAG) topology that utilizes an inter-node link (INL), the DCB-based path selection device comprising:
- an INL interface that communicatively couples the DCB-based path selection device to a LAG peer node via an INL, the LAG peer forwards, in response to having no DCB-enabled links to a downstream device, traffic on the INL to the DCB-based path selection device; and
- a non-transitory computer-readable medium or media comprising one or more sequences of instructions which, when executed by at least one processor, causes, responsive to DCB-based path selection device receiving DCB traffic on the INL, steps to be performed comprising:
  - indicating that the DCB traffic be forwarded on a LAG sub-trunk that comprises one or more DCB-enabled links;
  - overriding an egress mask that indicates to not forward traffic received at the LAG peer node on the INL; and
  - forwarding the DCB traffic received on the INL.

12. The DCB-based path selection device according to claim 11, wherein the egress mask is implemented in a forwarding table of the DCB-based path selection device and permits the DCB traffic to be forwarded via the one or more DCB-enabled links.

13. The DCB-based path selection device according to claim 11, wherein the LAG sub-trunk comprises a sub-group of links that are part of a LAG trunk that comprises the one or more DCB-enabled links and non-DCB-enabled links.

14. The DCB-based path selection device according to claim 11, wherein the DCB-based path selection device identifies the traffic as DCB traffic using IEEE 802.1p or differentiated services code point (DSCP) values.

15. A non-transitory computer-readable medium or media comprising one or more sequences of instructions which, when executed by at least one processor, causes steps to be performed comprising:
- receiving traffic at a LAG node associated with a LAG trunk that comprises:
  - a set of links whose physical status is up; and
  - a LAG sub-trunk that comprises a sub-set of links whose physical and DCB status are up;
- responsive to identifying DCB traffic in the traffic, forwarding the DCB traffic using at least one or more links of the LAG sub-trunk; and
- responsive to identifying non-DCB traffic in the traffic, irrespective of DCB status of the set of links, forwarding the non-DCB traffic using at least one or more links of the LAG trunk.

16. The non-transitory computer-readable medium or media according to claim 15, further causing steps to be performed comprising, in response to the DCB status of all links of the LAG sub-trunk that communicative couple the LAG sub-trunk to a recipient of the traffic being down, programming an inter-node link (INL) to become part of the LAG sub-trunk to forward DCB-enabled traffic, via the INL, to a LAG peer node that comprises one or more DCB-enabled links.

17. The non-transitory computer-readable medium or media according to claim 15, further causing steps to be performed comprising generating a forwarding table that identifies the sub-set of links whose DCB status are up as members of the LAG sub-trunk.

18. The non-transitory computer-readable medium or media according to claim 15, further causing steps to be performed comprising configuring the forwarding table to point to the LAG sub-trunk according to DCB link status.

19. The non-transitory computer-readable medium or media according to claim 18, further comprising steps to be performed comprising, in response to the DCB status of a link, which is coupled to the LAG node, changing to down, removing the link from the LAG sub-trunk and adjusting the forwarding table to exclude the link to indicate that the link is no longer suitable for DCB traffic.

20. The non-transitory computer-readable medium or media according to claim 19, further comprising, in response to the link changing status from down to up, automatically adding the link in the forwarding table.

* * * * *